United States Patent [19]

Okuyama et al.

[11] Patent Number: 5,582,424

[45] Date of Patent: Dec. 10, 1996

[54] OCCUPANT RESTRAINT DEVICE

[75] Inventors: Hiroyuki Okuyama, Ebina; Kei Iizuka, Zama, both of Japan

[73] Assignee: Nissan Motor Co., Ltd., Yokohama, Japan

[21] Appl. No.: 375,460

[22] Filed: Jan. 19, 1995

[30] Foreign Application Priority Data

Jan. 21, 1994 [JP] Japan .................................. 6-005244

[51] Int. Cl.⁶ .................................................. B60R 21/16
[52] U.S. Cl. ........................................ 280/728.3; 280/732
[58] Field of Search ............................ 280/728.1, 728.3, 280/731, 732

[56] References Cited

U.S. PATENT DOCUMENTS

| | | | |
|---|---|---|---|
| 4,148,503 | 4/1979 | Shiratori et al. | 280/728.3 |
| 4,903,986 | 2/1990 | Cok et al. | 280/731 |
| 5,060,971 | 10/1991 | Nanbu et al. | 280/728.3 |
| 5,084,122 | 1/1992 | Fukushima et al. | 280/731 |
| 5,110,647 | 5/1992 | Sawada et al. | 280/728.3 |
| 5,280,946 | 1/1994 | Adams et al. | 280/728.2 |
| 5,292,150 | 3/1994 | Watanabe et al. | 280/728.3 |
| 5,320,380 | 6/1994 | Hamada et al. | 280/728.3 |

FOREIGN PATENT DOCUMENTS 4-15145  1/1992  Japan .................................. 280/728.3

*Primary Examiner*—Paul N. Dickson
*Attorney, Agent, or Firm*—Lowe, Price, LeBlanc & Becker

[57] ABSTRACT

An occupant restraint device includes a container having an opening, a lid covering the opening of the container, and an inflatable occupant restraint cushion within the container. The cushion has a cushion portion adjacent the lid. The lid includes a first portion arranged to be first contacted by the inflatable occupant restraint cushion when it inflates and a second portion adjacent to the first portion. The first and second portions are perforated to provide different rupturabilities such that the first portion provides the greatest rupturability.

9 Claims, 7 Drawing Sheets

OCCUPANT RESTRAINT DEVICE

FIELD OF THE INVENTION

The present invention relates to an occupant restraint device, and more specifically to a lid of a container for housing an inflatable cushion of the occupant restraint device.

BACKGROUND OF THE RELEVANT ARTS

Occupant restraint devices are well known. One example of the occupant restraint devices includes a container having an opening, a lid covering the opening of the container, and an inflatable occupant restraint cushion within the container. The lid includes a portion rupturable by the occupant restraint cushion when the cushion inflates.

There is a demand for improve ruptuability of a lid of an occupant restraint device in order to provide smooth and well-directional deployment of the inflatable occupant restraint cushion when the cushion inflates.

SUMMARY OF THE INVENTION

A principal object of the present invention is to provide an improved occupant restraint device in which a rupture mode of a lid is stabilized to facilitate deployment of the cushion to thereby enhance the performance of the device.

According to one aspect of the present invention, there is provided in an occupant restraint device comprising.

a container having an opening;

a lid covering the opening of the container; and an inflatable occupant restraint cushion disposed within the container, the cushion having a cushion portion adjacent the lid;

said lid including a first portion arranged to be constructed first by the inflatable occupant restraint cushion when the inflatable occupant restraint cushion inflates and a second portion adjacent to the first portion;

the first and second portions being perforated to provide different rupturabilities such that the first portion provides the greatest rupturebility.

DESCRIPTION OF THE PREFERRED EMBODIMENT

Figure 1:
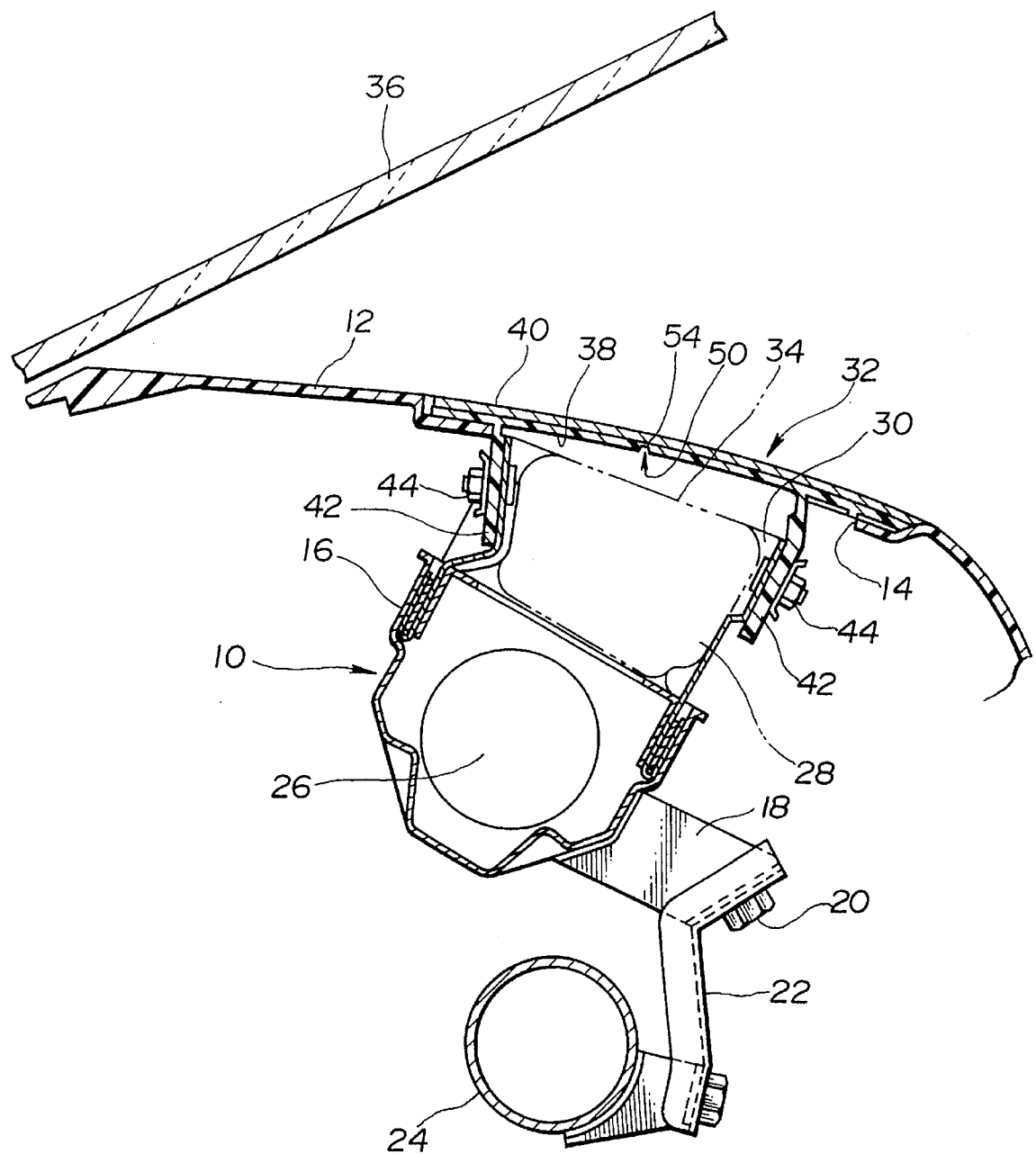
Fig. 1 is a schematic section of a first embodiment of an occupant restraint device according to the present invention, which is installed in an instrument panel.

Referring now to FIG. 1, an occupant restraint device 10 according to the present invention is installed inside a vehicular instrument panel 12. The occupant restraint device may be installed to other vehicular components such as a hub portion of a steering wheel. The instrument panel 12 is formed with an aperture 14 at a portion opposed to an occupant seated in a front passenger's compartment area.

As illustrated in FIG. 1, the occupant restraint device 10 includes a container 16. The container 16 is made of metal and has a cylindrical body which is of a generally rectangular shape in a top plan view. The container 16 has a lower portion as viewed in FIG. 1, to which a container support bracket 18 is attached. The container support bracket 18 is secured by means of a bolt and nut 20 to a bracket 22 fixed to a steering member 24. An inflator 26 is mounted inside the lower portion of the container 16.

An inflatable cushion 28 is so disposed in an upper portion as viewed in FIG. 1, of the container 16 as to be inflatable by gas emitted from the inflator 26. The container 16 has at the upper portion an opening 30 opposed to the aperture 14 of the container 12 and covered with a lid 32. The lid 32 has such a size and shape as to be fit to the aperture 14 of the container 12. The inflatable cushion 28 has a cushion portion 34 adjacent the lid 32.

The lid 32 is made of a synthetic resin, for example, TPE (thermoplastic elastomer), TPEE (thermoplastic elastomer ester), TEEE (thermoplastic elastomer ether ester) and the like, by double-layer injection molding. The lid 32 includes an inner layer 38 made of, for instance, TPO (thermoplastic olefin) having an increased rigidity and an outer layer 40 made of, for instance, SBC (styrene block copolymer) having a reduced rigidity. The inner layer 38 is formed with a downward extending flange 42 as viewed in FIG. 1. The flange 42 is fit on an outer periphery of the upper portion of the container 16 and secured by means of sets of bolts and nuts 44 thereto. Reference numeral 36 of FIG. 1 denotes a front window panel.

Figure 2:
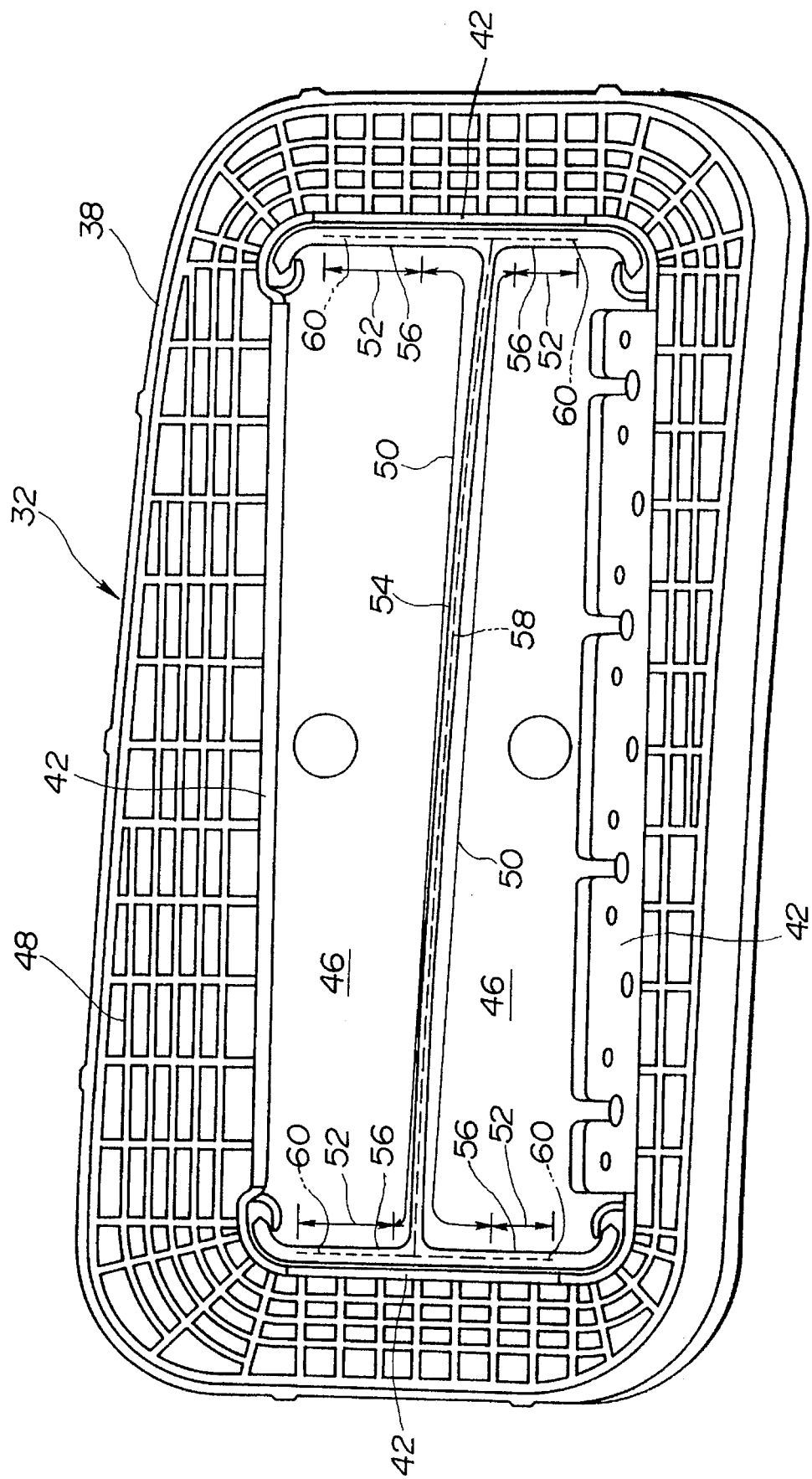
Fig. 2 is a bottom plan view of a lid of the occupant restraint device.

As illustrated in FIG. 2, the flange 42 surrounds an area of the inner layer 38 to define a wall section 46. A grid-shaped reinforcing rib 48 is disposed outside the wall section 46 on the inner layer 38. The lid 32 includes a first portion 50 arranged to be in the first to be hit by the inflatable occupant restraint cushion 28 when the inflatable occupant restraint cushion 28 inflates and a second portion 52 adjacent to the first portion 50. The first and second portions 50 and 52 are disposed within the wall section 46 on the inner layer 38. The first and second portions 50 and 52 are perforated to provide different rupturabilities such that the first portion 50 provides the greatest rupturabilities The first and second portions 50 and 52 cooperate to form a shape generally like the letter H.

Specifically explained, the first portion 50 includes a center cross bar section of the H extending diagonally across the center of the lid 32 and parts of opposite side sections of the H which are connected to the center cross bar section. The second portion 52 includes the remaining portion of each of the opposite side sections of the H extending along a periphery of the wall section 46 joined with the flange 42 in such directions as to be away from the first portion 50. The integral shape of the first and second portions 50 and 52 may be modified to be in the form of the letter U.

The first and second portions 50 and 52 are formed with grooves 54 and 56, respectively. The grooves 54 and 56 are continuously connected with each other and equal in depth.

Figure 3:
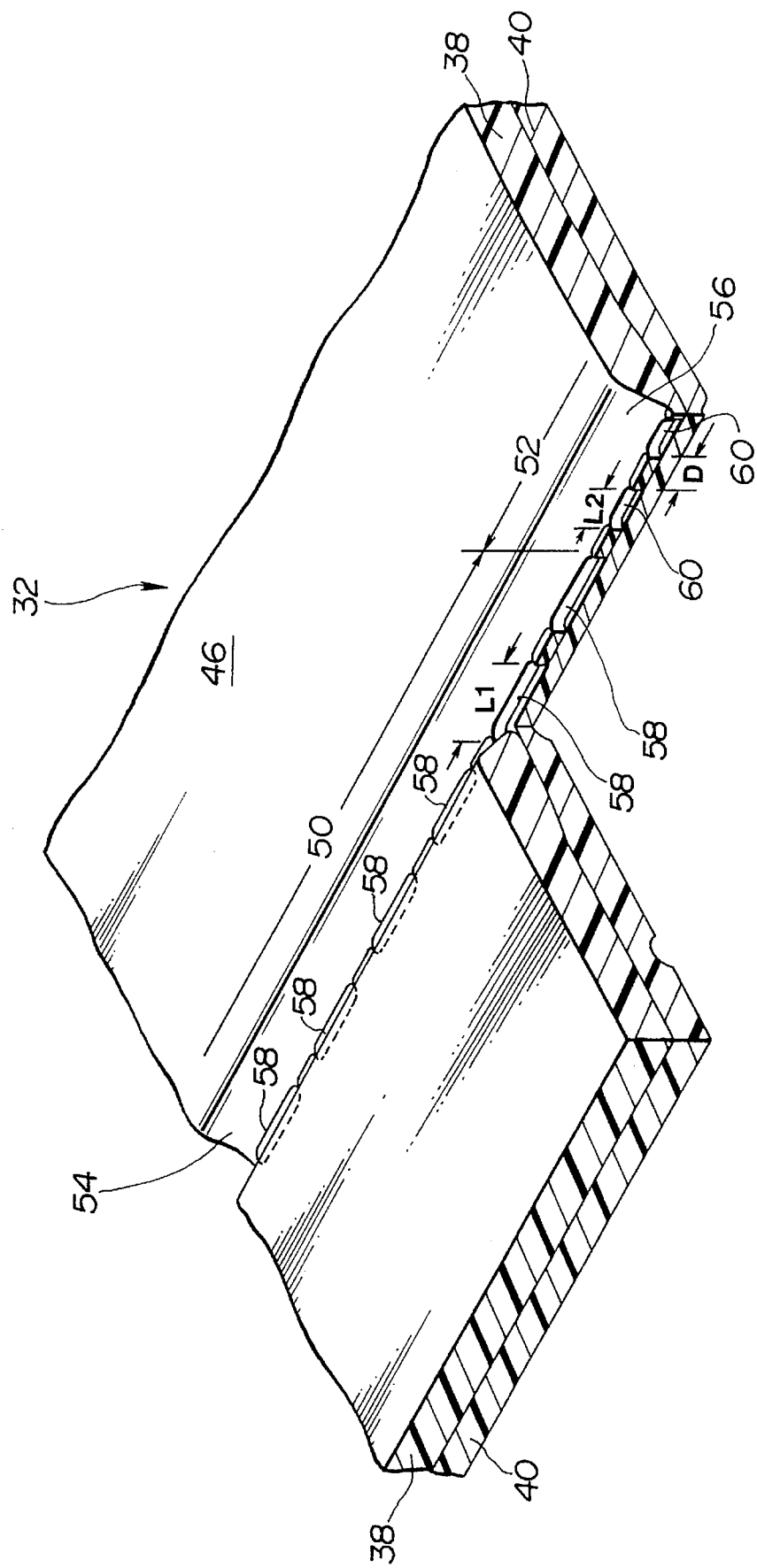
Fig. 3 is a fragmentary enlarged perspective view, partially sectioned, of the lid, showing a plurality of perforations of first and second portions.

The first portion 50 is formed with a plurality of perforations 58 through a bottom wall of the groove 54 as illustrated in FIG. 3. The second portion 52 is formed with a plurality of perforations 60 through a bottom wall of the groove 56 as shown in FIG. 3. The perforations 58 and 60 are arranged in line along the bottom walls of the grooves 54 and 56, respectively, and spaced in an equidistant relation as indicated at D in FIG. 3. The perforations 58 of the first portion 50 have an increased length L1 and the perforations 60 of the second portion 52 have a reduced length L2, respectively. Thus, the second portion 52 provides less rupturability than the rupturability of the first portion 50. The perforations 58 and 60 of different lengths are readily formed during the double-layer injection molding process of of the lid 32.

When the inflatable occupant restraint cushion 28 inflates, the cushion portion 34 hits the first portion 50 of the lid 32. The rupture of the lid 32 starts from the first portion 50 and advances to the second portion 52. The lid 32 is forced to separate into two doors hinged at opposite upper and lower peripheral portions, as viewed in FIG. 2, of the wall section 46 which are disposed between the grooves 56 representing the sides of the H the second portion 52. The arrangement of the first portion 50 with the greatest rupturability and the second portion 52 with the less rupturability causes smooth propagation of the rupture of the lid 32. This serves for quick and well-directional deployment of the occupant restraint cushion 28, resulting in an improved performance.

Figure 4:
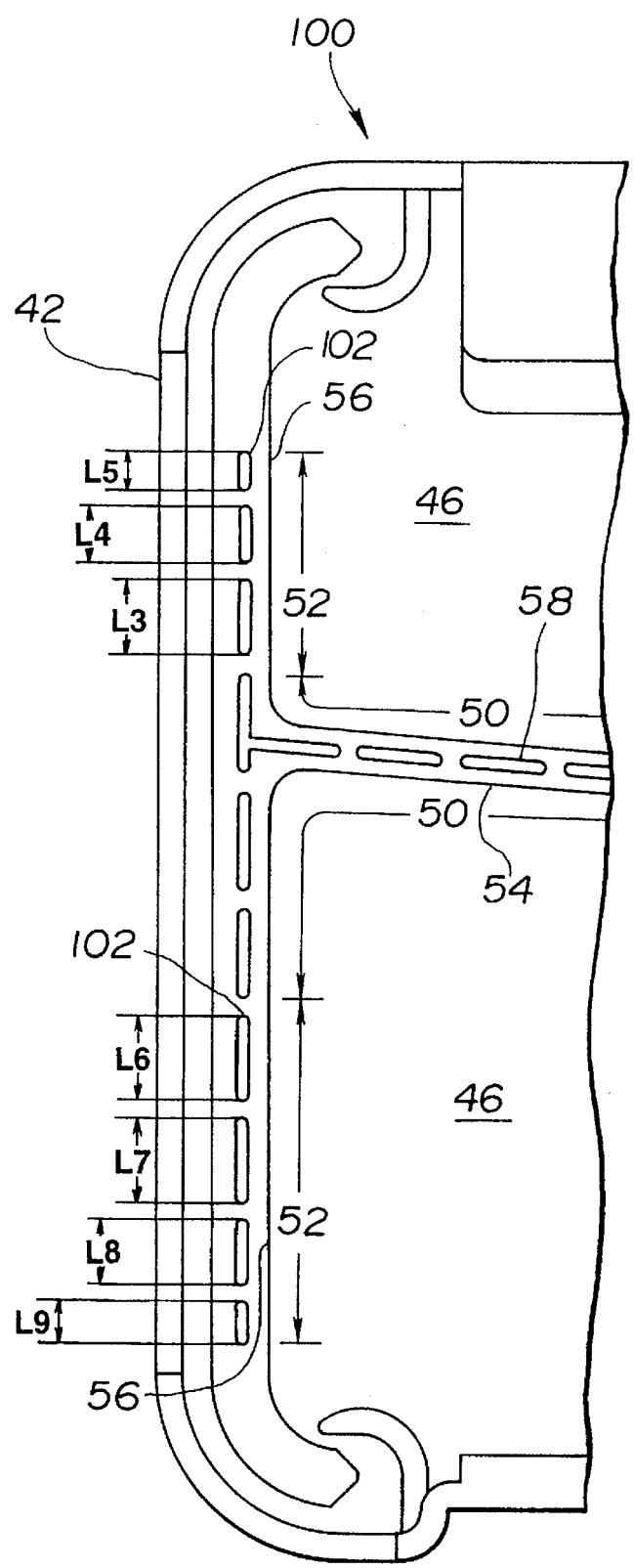
Fig. 4 is a fragmentary enlarged bottom plan view of a second embodiment of a lid of an occupant restraint device according to the present invention.

FIG. 4 illustrates a second embodiment of a lid 100 of the occupant restraint device according to the present invention. The lid 100 of the second embodiment differs from the aforementioned first embodiment in a modified arrangement of perforations 102 of the second portion 52. Like numerals denote like parts and therefore detailed descriptions thereof are omitted.

As illustrated in FIG. 4, the perforations 102 of the second portion 52 have lengths L3, L4, L5, L6, L7, L8 and L9 which are smaller than lengths of each of the perforations 58 of the first portion 50 and decrease gradually as remote from the first portion 50. In Fig. 4, the three perforations 102 with different lengths L3–L5 and the Four perforations 102 with different lengths L6–L9 are arranged in the second portion 52. The number of the perforations 102 of the second portion 52 is not limited to those of the second embodiment as shown in FIG. 4. Thus, similarly to the First embodiment, the first and second portions 50 and 52 the second embodiment have different rupturabilities such that the first portion 50 provides the greatest rupturability. This arrangement facilitates a smooth propagation of the rupture of the lid 100 and serves for enhancing a quick response to inflation of the occupant restraint cushion 28. Thus, a rupturing mode of the lid 100 is stabilized.

Figure 5:
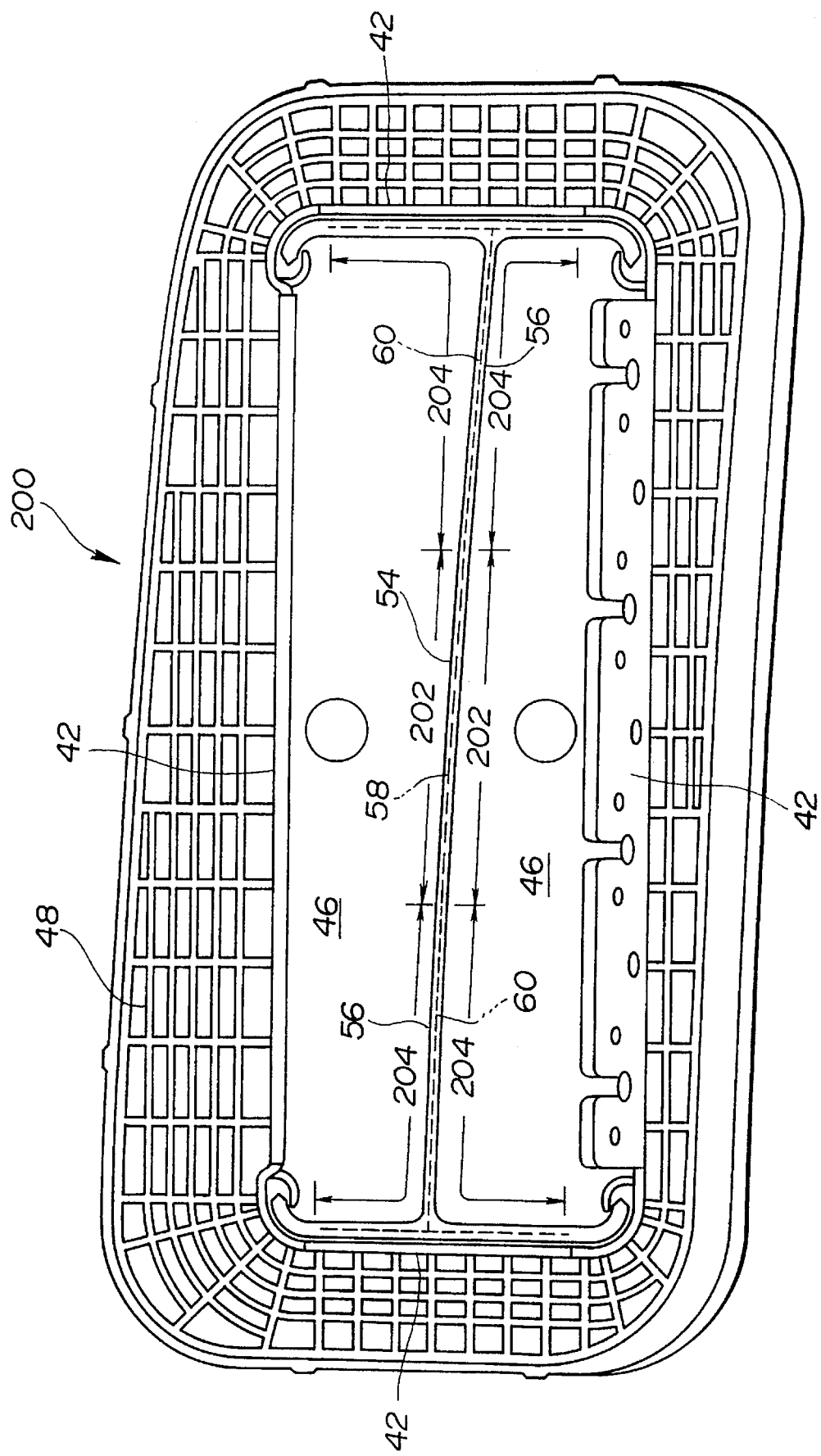
Fig. 5 is a bottom plan view of a third embodiment of a lid of an occupant restraint device according to the present invention.

Referring to FIG. 5, there is shown a third embodiment of a lid 200 of the occupant restraint device according to the present invention. The lid 200 of the third embodiment differs from the aforementioned first embodiment in a modified arrangement of a first portion 202 and a second portion 204. Like numerals denote like parts and therefore detailed descriptions thereof are omitted.

As illustrated in FIG. 5, the first portion 202 includes the center off the lid 200 and has a length of generally one thirds or less of total length of the first and second portions 202 and 204. In other words, the first and second portions 202 and 204 are so arranged as to be generally in the ratio of one to two (1:2) or less in length. The first portion 202 has a minimum length of approximately one thirds of the center cross bar section of the letter H. If the first portion 202 has a length lesser than the length of one third of the center cross bar section of the H, the center portion of the lid 200 has too much increased rigidity causing the reduced rupturability of the lid 200. This arrangement serves for providing a sufficient rigidity of the center portion of the lid 200 without reducing the rupturability of the lid 200. Thus, the first and second portions 202 and 204 in the third embodiment have different rupturabilities such that the first portion 202 provides the greatest rupturability as well as the first and second embodiments.

Figure 6:
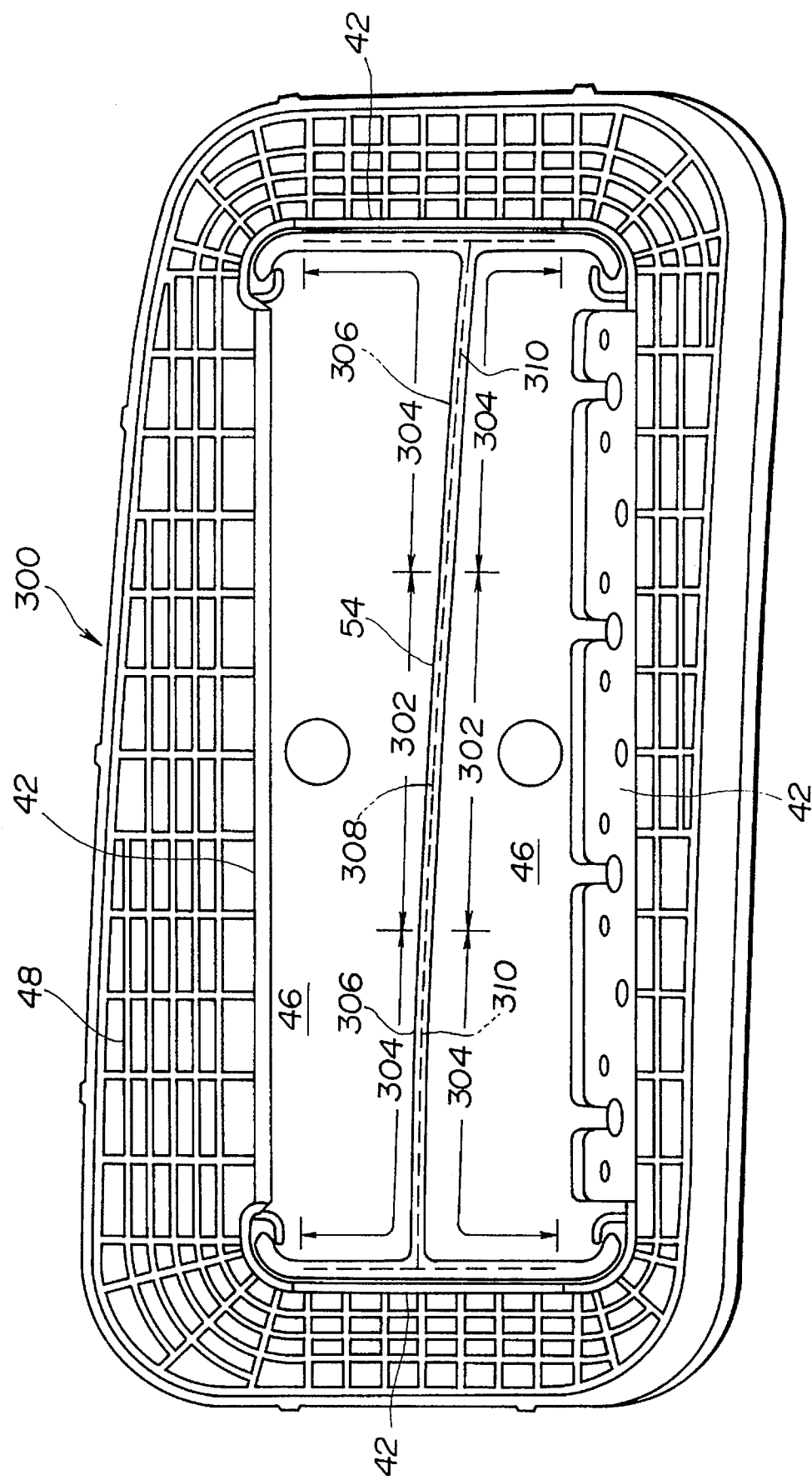
Fig. 6 is a bottom plan view of a fourth embodiment of a lid of an occupant restraint device according to the present invention.
Figure 7:
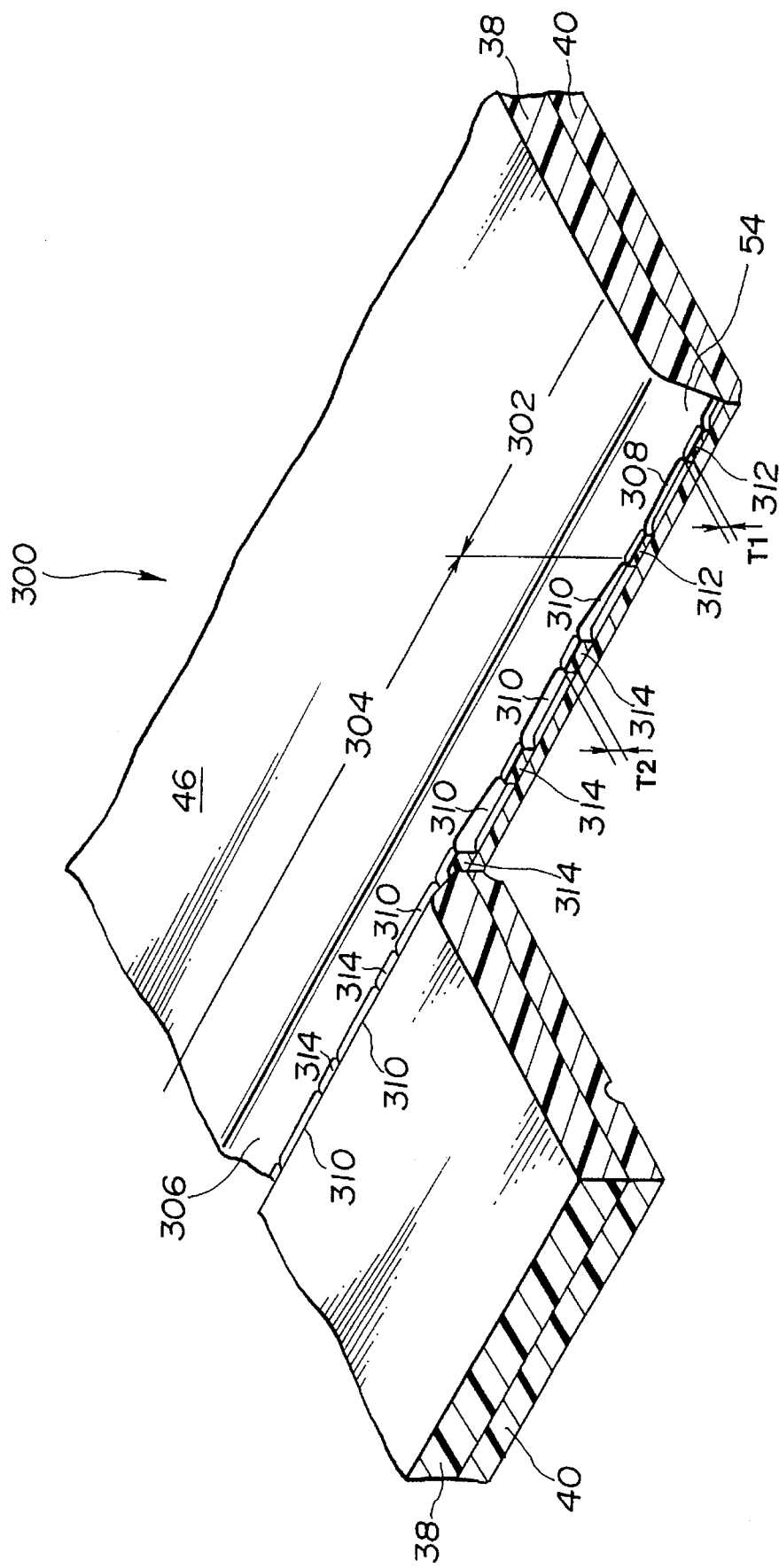
Fig. 7 is a fragmentary enlarged perspective view, partially sectioned, of the lid of FIG. 6.

Referring now to FIGS. 6 and 7, there is shown a fourth embodiment of a lid 300 of the occupant restraint device according to the present invention. The lid 300 of the fourth embodiment differs from the aforementioned first embodiment in a further modified arrangement of a first portion 302, a second portion 304, a groove 306 of the second portion 304, perforations 308 of the first portion 302 and perforations 310 of the second portion 304. Like numerals denote like parts and therefore detailed descriptions thereof are omitted.

As illustrated in FIG. 6, similarly to the third embodiment, the first portion 302 includes the center of the lid 300 and has a length of generally one third or less of total length of the first and second portions 302 and 304. The first portion 302 has a minimum length of approximately one thirds of the center cross bar section of the letter H. The perforations 308 of tile first portion 302 and the perforations 310 of the second portion 304 are same in length and arranged in an equidistantly spaced relation. As illustrated in FIG. 7, the groove 306 of the second portion 304 is less in depth than the groove 54 of the first portion 302, and the depth of the groove 306 decreases gradually as the groove 306 extends away from the first portion 302.

Specifically explained, the perforations 308 of the first portion 302 are disposed alternately with bridge portions 312 and the perforations 310 of the second portion 304 alternately with bridge portions 314. Consequently, the bridge portions 314 of the second portion 304 have greater thickness T2 than thickness T1 of the bridge portions 312 of the first portion 302. The thickness T2 of the bridge portions 314 of the second portion 304 increases gradually as the bridge portions 314 are remote from the first portion 302. For instance, if the bridge portions 312 of the first portion 302 are of 0.5 m/m thickness, the bridge portions 314 of the second portion 304 are of 1 m/m thickness in an area spaced at a smaller distance from the first portion 302 and of 1.5 m/m in an area spaced from a greater distance therefrom. Similarly to the aforementioned embodiments, the first and second portions 302 and 304 in the fourth embodiment have different rupturabilities such that the first portion 302 provides the greatest rupturability. Thus, the arrangement of the fourth embodiment serves for stabilizing the rupture mode of the lid 300 to thereby improve the performance of the occupant restraint device, and providing a sufficient rigidity of the center portion of the lid 300 as well as the third embodiment.

In the aforementioned second, third and fourth embodiments, the provision of the perforations having different lengths and the bridge portions having different thicknesses readily performed obtained during the double-layer injection molding process of the lid.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. An occupant restraint device, comprising:

a container having an opening;

a lid covering said opening of said container; and an inflatable occupant restraint cushion disposed within said container, said cushion having a cushion portion adjacent said lid said lid including a first portion which is so disposed relative to said cushion portion as to provide an arrangement wherein said first portion is contacted first by said cushion portion when said cushion inflates, and a second portion connected with said first portion to define limits of said first portion and extending in a direction away from said first portion, and said first and second portions including respective first and second grooves each having a bottom wall formed with a plurality of perforations, wherein the plurality of perforations of said first groove are equidistant from one another and are each of a first common length along said first groove, the plurality of perforations of said second groove are equidistant from one another and are each of a respective second length along said second groove, the second length being shorter than the first length, whereby said first portion provides a higher rupturability than does said second portion.

2. The occupant restraint device as claimed in claim 1, wherein:

said plurality of perforations of each of said first and second grooves are disposed alternately with respective bridge portions.

3. The occupant restraint device as claimed in claim 2 wherein:

the bridge portions of said second groove have a greater thickness than the bridge portions of said first groove.

4. The occupant restraint device as claimed in claim 3 wherein:

the thickness of the bridge portions of said second groove decreases as a distance from the limits of said first portion to each of the bridge portions of said second groove decreases.

5. The occupant restraint device as claimed in claim 1 wherein:

said first portion includes a center of said lid.

6. The occupant restraint device as claimed in claim 1 wherein:

said lid includes an inner layer and an outer layer having respectively different rigidities.

7. The occupant restraint device as claimed in claim 6 wherein:

said first and second portions are disposed on said inner layer.

8. An occupant restraint device, comprising:

a container having an opening;

a lid covering said opening of said container; and an inflatable occupant restraint cushion disposed within said container, said cushion having a cushion portion adjacent said lid, said lid including a first portion which is so disposed relative to said cushion portion as to provide an arrangement, wherein said first portion is contacted first by said cushion portion of said inflatable occupant restraint cushion when said inflatable occupant restraint cushion inflates and a second portion connected with said first portion to define limits of said first portion and extending in a direction away from said first portion, wherein said first and second portions include respective first and second grooves, each groove having a bottom wall formed with a respective plurality of perforations, said plurality of perforations of said first groove being equidistant from one another and each of said plurality of perforations of said first groove having a first common length along said first groove, and said plurality of perforations of said second groove being equidistant from one another and each of said plurality of perforations of said second groove having a second length along said second groove which is shorter than said first common length, and wherein as a distance measured from the limits of said first portion to each of said plurality of perforations of said second groove decreases the respective length of each said plurality of perforations of said second groove increases, whereby said first portion provides a higher rupturability than does said second portion.

9. An occupant restraint device comprising:

a container having an opening;

a lid covering said opening of said container; and an inflatable occupant restraint cushion disposed within said container, said cushion having a cushion portion adjacent said lid, said lid including a first portion which is so disposed relative to said cushion portion as to provide an arrangement wherein said first portion is contacted first by said cushion portion of said inflatable occupant restraint cushion when said inflatable occupant restraint cushion inflates, and a second portion connected with said first portion to define limits of said first portion and extending in such a direction as to be far away from said first portion, said first and second portions including first and second grooves, respectively, each having a bottom wall formed with a plurality of perforations, and said plurality of perforations of said first groove being equidistant from one another, and said plurality of perforations of said second groove being equidistant from one another, wherein said first portion has a length of generally one third or less of a total length of said first and second portions, and wherein each of said plurality of perforations of said first groove has a first common length along said first groove, and each of said plurality of perforations of said second groove has a second length along said second groove which is shorter than said first common length.

* * * * *